(No Model.)
G. SUTTON.
MEANS FOR ASSISTING PERSONS IN PUTTING ON OUTSIDE WRAPPINGS.
No. 305,406. Patented Sept. 16, 1884.
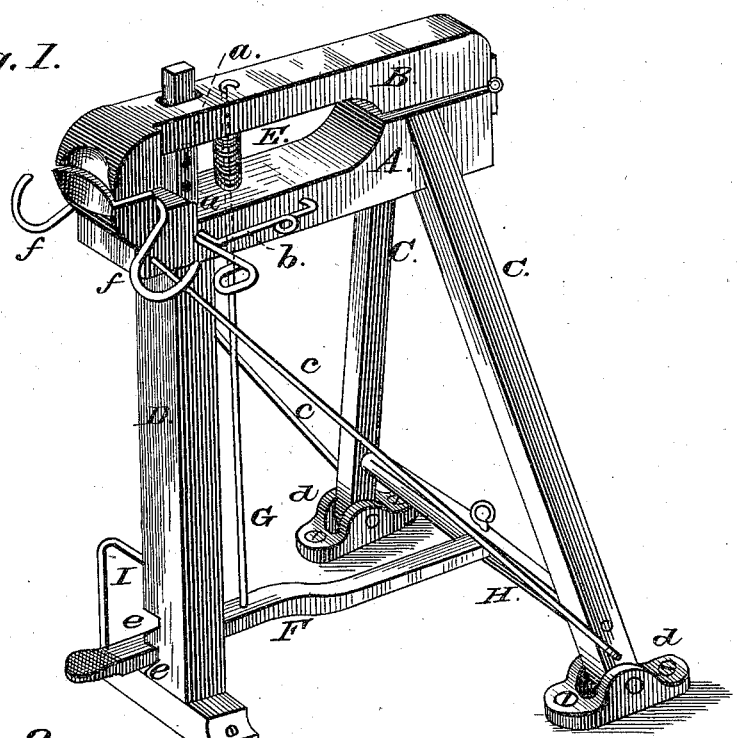
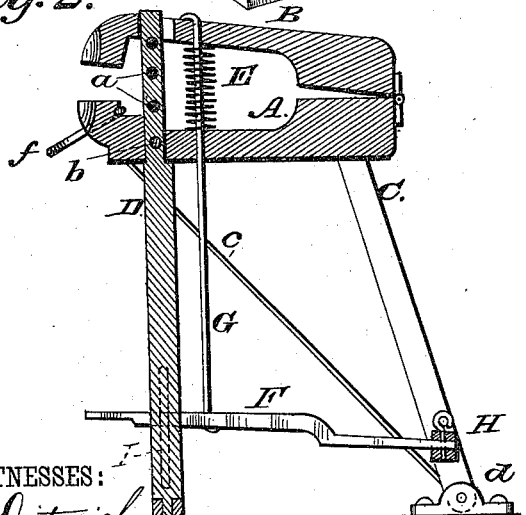

UNITED STATES PATENT OFFICE.

GREENUP SUTTON, OF RUSHVILLE, MISSOURI.

MEANS FOR ASSISTING PERSONS IN PUTTING ON OUTSIDE WRAPPINGS.

SPECIFICATION forming part of Letters Patent No. 305,406, dated September 16, 1884.

Application filed March 10, 1884. (No model.)

*To all whom it may concern:*

Be it known that I, GREENUP SUTTON, a citizen of the United States, residing at Rushville, in the county of Buchanan and State of Missouri, have invented certain new and useful Improvements in Overcoat - Helpers, of which the following is a description.

Figure 1 is a perspective view of the invention, and Fig. 2 is a vertical longitudinal section of the same.

The object of my invention is to provide a device for assisting persons in putting on overcoats or outside wrappings, the same being especially designed for stout persons, persons feeble from sickness or old age, and one-armed persons, or for assisting in putting on ladies' cloaks, which usually have to be adjusted by a second party on account of the restraint involved by the tight fitting of the undergarment.

My invention consists of a frame-work or stand provided with clamping-jaws for holding the coat-collar, a treadle for operating the jaws, and hooks or supports for distending the sleeves of the garment to convenient position, as hereinafter fully described.

In the drawings, A B are two horizontal jaws, hinged at one end, and having their working ends or faces somewhat curved inward or concaved to correspond to the shape of the neck. The lower jaw, A, is mounted at the rear end upon two legs, C C, and at its front end upon a single leg, D, which front leg at its upper end passes through a mortise in the lower and upper jaw, and is provided with a series of lateral holes or notches, *a*, into which a spring-bolt, *b*, is made to enter from the side of the lower jaw, and which series of holes and the spring-bolt serve to adjust the front of the jaws higher or lower to suit the size of the person. The lower jaw is firmly braced to the hind legs by brace-rods *c c*, and said rear legs are jointed to bottom bars or shoes, *d d*. The jaws are normally held apart or open by a spiral spring, E, between them, and are brought together by a treadle, F, and pull-rod G, which treadle is connected to a cross-bar, H, pivoted between the rear legs, and which pull-rod G passes up through a hole in the lower jaw and through the spiral spring, and connects with the upper jaw. The treadle F is guided beside the front leg by a keeper, I, and notches *e* are formed in the side of the front leg, beneath which the treadle is caught when it is forced down to close the jaws, and which notches are the same distance apart as the holes *a* in the top of the front leg. The front leg is also provided with a foot at the bottom. To the lower jaw there is attached, or from it is suspended, on each side, a laterally-projecting hook or support, *f*, which two hooks are designed to catch under the sleeves of the coat and hold them distended in convenient position for the insertion of the arms. The jaws are preferably lined or upholstered with some soft fabric or pliant material to prevent injury to the garment and to give a better hold thereon.

In making use of my invention the overcoat or other garment is adjusted with the collar between the jaws A B, and the treadle is then brought down and the jaws made to close upon the collar and hold the coat suspended, the treadle being at the same time forced into a notch in the front leg to hold the jaws closed. The sleeves are then distended and suspended upon the hooks *f*, and the coat is now in position with its inside facing its owner, who turns his back thereto, places his arms in the sleeves, and then, kicking the treadle from its notch, allows the jaws to open and the coat to easily adapt itself to its place on his back.

In making use of my invention I do not confine myself to any particular form of stand, as this may be varied, and may be made of either wood or metal, as desired.

Having thus described my invention, what I claim as new is—

1. A device for assisting in putting on coats, consisting of a pair of jaws for sustaining the coat, a support or frame for holding said jaws, hooks or supports for the sleeves of the coat, arranged to project laterally on each side of the jaws, and means for operating the jaws, substantially as shown and described.

2. A device for assisting in putting on coats, consisting of a pair of jaws, a support for the same, a spring for holding them apart, a treadle for bringing them together, and hooks or supports for the sleeves, arranged to project laterally on each side of the jaws, as and for the purpose described.

3. The combination of the jaws A B, legs C C, adjustable leg D, treadle F, pull-rod G, connecting the treadle with one of the jaws, spring E between the jaws, and hooks $f\,f$, projecting laterally from the lower jaw, substantially as and for the purpose described.

GREENUP SUTTON.

Witnesses:
E. C. WELLS,
A. T. JONES.